(12) United States Patent
Aggarwal

(10) Patent No.: US 7,421,452 B2
(45) Date of Patent: Sep. 2, 2008

(54) METHOD AND APPARATUS FOR PREDICTING FUTURE BEHAVIOR OF DATA STREAMS

(75) Inventor: Charu C. Aggarwal, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 11/452,585

(22) Filed: Jun. 14, 2006

(65) Prior Publication Data

US 2007/0294216 A1      Dec. 20, 2007

(51) Int. Cl.
*G06F 17/30* (2006.01)
(52) U.S. Cl. .......................................... 707/102; 707/1
(58) Field of Classification Search ......... 707/100–102, 707/1–6
See application file for complete search history.

(56) References Cited

U.S. PATENT DOCUMENTS

| | | | | |
|---|---|---|---|---|
| 5,257,206 | A * | 10/1993 | Hanson | 700/273 |
| 5,291,602 | A * | 3/1994 | Barker et al. | 715/203 |
| 6,915,241 | B2 * | 7/2005 | Kohlmorgen et al. | 702/189 |
| 7,072,891 | B2 * | 7/2006 | Lee et al. | 707/6 |
| 7,353,218 | B2 * | 4/2008 | Aggarwal et al. | 707/1 |
| 7,379,939 | B2 * | 5/2008 | Aggarwal et al. | 707/100 |

OTHER PUBLICATIONS

A. Dobra et al., "Processing Complex Aggregate Queries Over Data Streams," ACM SIGMOD Conference, 12 pages, Jun. 2002.
A. Dobra et al., "Sketch Based Multi-Query Processing Over Data Streams," EDBT Conference, 18 pages, 2004.
A. Gilbert et al., "Surfing Wavelets on Streams: One-Pass Summaries for Approximate Aggregate Queries," Proceedings of the 27th VLDB Conference, 10 pages, 2001.
A. Gilbert et al., "How to Summarize the Universe: Dynamic Maintenance of Quantiles," Proceedings of the 28th VLDB Conference, 12 pages, 2002.
G. Manku et al., "Approximate Frequency Counts over Data Streams," Proceedings of the 28th VLDB Conference, 12 pages, 2002.
J. Vitter et al., "Approximate Computation of Multidimensional Aggregates of Sparse Data Using Wavelets," ACM SIGMOD Conference, 12 pages, 1999.
C.C. Aggarwal, "A Framework for Diagnosing Changes in Evolving Data Streams," SIGMOD, 12 pages, Jun. 2003.
C.C. Aggarwal et al., "A Framework for Clustering Evolving Data Streams," Proceedings of the 29th VLDB Conference, 12 pages, 2003.
B. Babcock et al., "Models and Issues in Data Stream Systems," ACM PODS Conference, 16 pages, 2002.

(Continued)

*Primary Examiner*—Yicun Wu
(74) *Attorney, Agent, or Firm*—Mark Wardas; Ryan, Mason & Lewis, LLP

(57) ABSTRACT

Techniques are disclosed for predicting the future behavior of data streams through the use of current trends of the data stream. By way of example, a technique for predicting the future behavior of a data stream comprises the following steps/operations. Statistics are obtained from the data stream. Estimated statistics for a future time interval are generated by using at least a portion of the obtained statistics. A portion of the estimated statistics are utilized to generate one or more representative pseudo-data records within the future time interval. Pseudo-data records are utilized for forecasting of at least one characteristic of the data stream.

1 Claim, 5 Drawing Sheets

OTHER PUBLICATIONS

Y. Chen et al., "Multi-Dimensional Regression Analysis of Time-Series Data Streams," Proceedings of the 28th VLDB Conference, 12 pages, 2002.

C. Cortes et al., "Hancock: A Language of Extracting Signatures from Data Streams," Proceedings of the Sixth International Conference on Knowledge Discovery and Data Mining, 9 pages, 2000.

P. Domingos et al., "Mining High-Speed Data Streams," ACM KDD Conference, 10 pages, 2000.

F. Farnstrom et al., "Scalability for Clustering Algorithms Revisited," ACM SIGKDD, vol. 2, Issue 1, pp. 51-57, Jul. 2000.

D. Gunopulos et al., "Approximating Multi-Dimensional Aggregate Range Queries Over Real Attributes," ACM SIGMOD Conference, 12 pages, 2000.

L. O'Callaghan et al., "Streaming-Data Algorithms for High-Quality Clustering," IEEE ICDE Conference, pp. 1-25, 2002.

* cited by examiner

US 7,421,452 B2

METHOD AND APPARATUS FOR PREDICTING FUTURE BEHAVIOR OF DATA STREAMS

FIELD OF THE INVENTION

This present invention relates to data processing techniques and, more particularly, to techniques for predicting future behavior of data streams through the use of statistics acquired from the data streams.

BACKGROUND OF THE INVENTION

Recent advances in hardware technology have resulted in the ability to collect and process large amounts of data. For example, the use of credit cards or the accessing of a web page can create large amounts of data records in an automated way. These dynamically growing data sets are often referred to as data streams. The fast nature of data streams constrains their applicability to data mining tasks. For example, data streams cannot be re-examined in the course of their computation, thus requiring algorithms to be executed on the first pass of the data. Further, due to the fast nature of data streams, an effective model needs to be robust enough to be able to be rapidly updated during the course of the computation. Because of these requirements, standard data mining algorithms on static data sets cannot be easily modified to be used on data streams.

An important problem in data stream computation is query processing. Such queries include, by way of example only, problems such as selectivity estimation of range queries. This problem has been explored in the context of data streams but has been limited to methods designed for processing of historical queries. Examples of such research are disclosed in A. Dobra et al., "Processing Complex Aggregate Queries over Data Streams" ACM SIGMOD Conference, 2002; A. Dobra et al., "Sketch Based Multi-Query Processing Over Data Streams" EDBT Conference, 2004; A. Gilbert et al., "Surfing Wavelets on Streams: One-pass Summaries for Approximate Aggregate Queries" VLDB Conference 2001; A. Gilbert et al., "How to Summarize the Universe: Dynamic Maintenance of Quantiles" VLDB Conference, 2002; G. Manku et al., "Approximate Frequency Counts over Data Streams" VLDB Conference, 2002; J. Vitter et al., "Approximate Computation of Multidimensional Aggregates of Sparse Data using Wavelets." ACM SIGMOD Conference, 1999, the disclosures of which are incorporated by reference herein.

SUMMARY OF THE INVENTION

The present invention provides techniques for predicting the future behavior of data streams through the use of current trends of the data stream. While not limited thereto, such techniques have been developed and tested for query selectivity estimation.

By way of example only, in one aspect of the invention, a technique for predicting the future behavior of at least one characteristic of a data stream comprises the following steps/operations. Statistics are obtained from the data stream. Estimated statistics for a future time interval are generated by using at least a portion of the obtained statistics. A portion of the estimated statistics are utilized to generate one or more representative pseudo-data records within the future time interval. Pseudo-data records are utilized for forecasting of at least one characteristic of the data stream.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
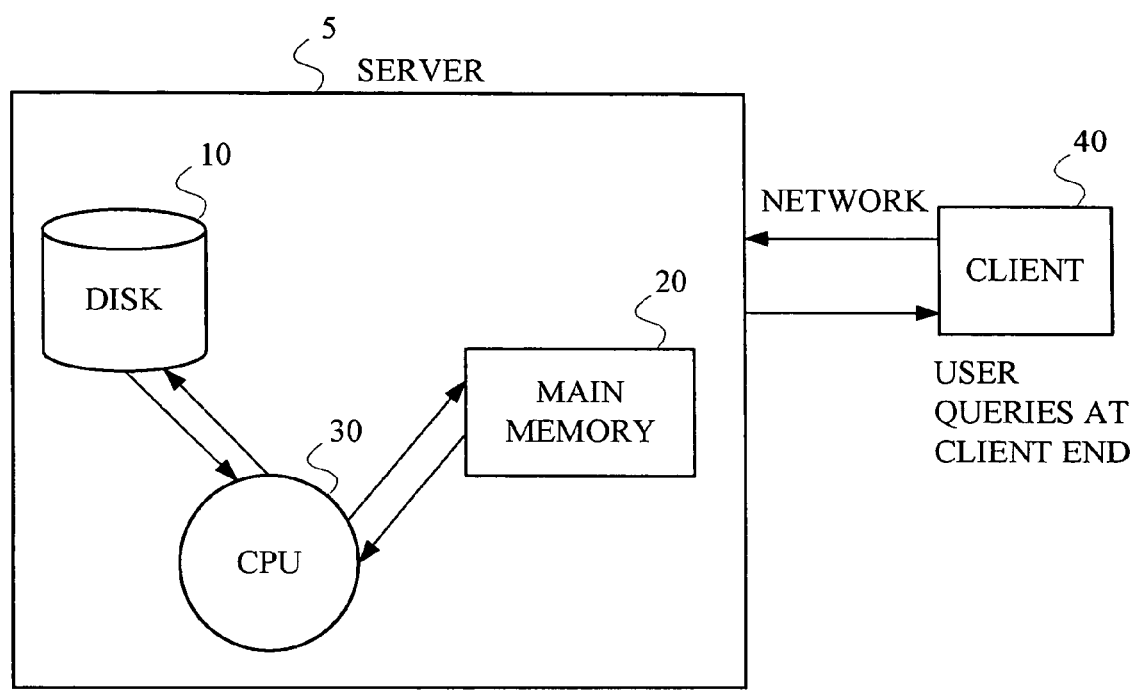
FIG. 1 is a block diagram illustrating a hardware implementation suitable for employing methodologies, according to an embodiment of the present invention.

The following description will illustrate the invention using an exemplary data processing system architecture. It should be understood, however, that the invention is not limited to use with any particular system architecture. The invention is instead more generally applicable to any task that would benefit from predictive data summarization.

As will be illustrated below the present invention introduces techniques for predicting the future behavior of data streams through the use of current trends of the data stream and, more particularly, techniques for generating representative pseudo-data records to process predictive queries.

As discussed herein the phrase "data stream" may generally refer to a continuous sequence of data over a given time period. By way of example, such a sequence of data may be generated by a real-time process which uses continuous data storage. For example, even simple transactions of every day life such as using a credit card result in automated storage at the credit card company's database. For a major company, this could result in millions of transactions full of data. The term "pseudo-data," as used herein, refers not to actual data records, but to representative data records generated to represent future behavior of the data stream. The terms "data points" and "data records," as used herein, can be used interchangeably of one another. A characteristic of a data stream, by way of example only, may refer to the selectivity estimation of a query.

Predictive query estimation is a significantly more difficult problem than historical query processing. This is because the historical behavior of the stream is already available, whereas the future behavior can only be estimated from current trends in the data stream.

In a predictive query estimation problem, the selectivity of queries of a future time interval is estimated by making use of the current trends of the data stream. For predictive query estimation, an approach that utilizes a local regression analysis is used in conjunction with storage of the summary covariance structure of different data localities. The approach stores statistics that are then used to create effective predictive samples in different data localities. These samples, the size of which can be varied depending on the desired level of accuracy, can be used to estimate the accuracy of the underlying queries.

In order for predictive selectivity estimation to be performed, a sufficient amount of statistics need to be obtained from the data stream so that the overall behavior of the data can be estimated. An approach used in this embodiment stores summary statistics so that representative pseudo-data can be generated for a future time interval. These summary statistics include the number of data points arriving, the mean along each dimension as well as relevant second order statistics which contain the covariance structure of the data. These statistics are then used to estimate the corresponding statistics for a future time interval. These estimated statistics are then used to generate the pseudo-data records within the future time interval. The pseudo-data records will not represent the true records within the corresponding future time interval, but their aggregate statistics will reflect the selectivity of the corresponding queries. The advantage of using pseudo-data is that it can be leveraged to estimate the selectivity of queries that are not restricted to any particular geometry or form.

The statistics obtained from the data stream are maintained by a stream summarization algorithm. The summary statistics consist of the first order statistics as well as the co-variance structure of the data. Some notations and definitions will be introduced, before the summary statistics are introduced. Consider a set of N records denoted by D, each of which contains d dimensions. The records in the database D are denoted by $X_1 \ldots X_N$. The dimensions of each individual record $X_i$ are denoted by $x_i^1 \ldots x_i^d$. For a subset of records Q from the database D, the summary statistics are defined as Stat(Q)=(Sc(Q), Fs(Q), n(Q)), which defines the complete covariance structure of Q. Specifically, Sc(Q) corresponds to the second order statistics of Q, Fs(Q) corresponds to the first order structure of Q, and n(Q) corresponds to the number of data points (the zeroith order statistics) in Q.

Second order statistics are useful in computing the covariance structure of data records. The second order statistics that are maintained are described as follows: for each pair of dimensions i and j, the sum of the products of the corresponding dimension pairs is stored. To avoid duplication and for convention, it is assumed that i is less than or equal to j. The product sum for the dimension pairs i, j and the record set Q is denoted by $Sc_{ij}(Q)$. The corresponding value is defined as follows:

$$Sc_{ij}(Q) = \sum_{k \text{ in } Q} x_i^k \cdot x_j^k$$

The first order statistics that are maintained are described as follows: for each dimension i the sum of the individual attribute values is maintained, resulting in a total of d values being maintained. The value for the dimension i is denoted by $Fs_i(Q)$, and is defined as follows:

$$Fs_i(Q) = \sum_{k \text{ in } Q} x_i^k$$

The vector $Fs_1(Q) \ldots Fs_d(Q)$ is denoted by Fs(Q). The zeroith order statistics, n(Q), contains one value and is equal to the number of records in Q. Since each set of statistics can be represented as the sum of the corresponding base statistics, these statistical values can be efficiently maintained in the context of the data stream. This is because Stat(Q) can be computed as the simple arithmetic sum over the corresponding functional values over individual records.

Referring initially to FIG. 1, a block diagram illustrates a hardware implementation suitable for employing methodologies described herein, according to an embodiment of the present invention. As illustrated, an exemplary system comprises of server 5 that comprises of disk 10 that stores the input data stream and main memory 20 and central processing unit (CPU) 30 which can perform most of the computational processing over the data stream. Data at client end 40 is transmitted over a network to server 5. It is to be appreciated that the network may be a public information network such as, for example, the Internet or World Wide Web, however, the clients and server may alternatively be connected via a private network, a local area network, or some other suitable network. The input data stream is also fed to server 5. While the architecture described here is especially useful for user queries, it can be used for any kind of data mining application.

Figure 2:
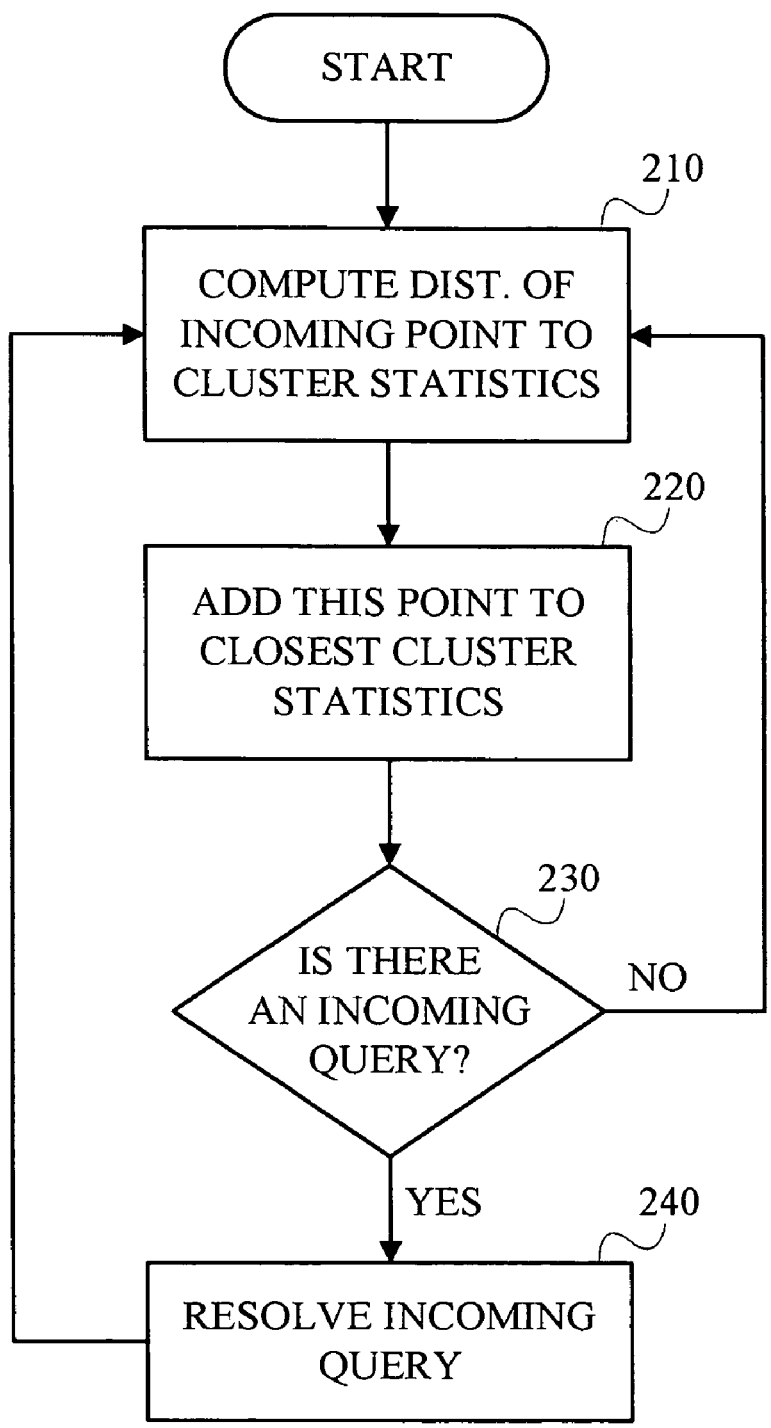
FIG. 2 is a flow chart illustrating a process for performing the predictive query estimation, according to an embodiment of the present invention.

Referring now to FIG. 2, a flow chart illustrates the overall process of performing the query estimation. In this embodiment, statistics are obtained from the data stream, and are continually updated using additive operations. In each iteration, the distance of each incoming data point to the centroid of the statistics of the closest cluster is computed. The data point is added to the closest centroid, and the corresponding statistics are updated as well. Thus, as shown, in step 210, the distance of the incoming data point to the different cluster statistics is computed. In step 220, this point is added to the closest cluster statistics. Step 230 checks if there is an incoming query. If there is not an incoming query, step 210 is repeated. If there is an incoming query, the query is resolved in step 240, followed by step 210 being repeated.

Figure 3:
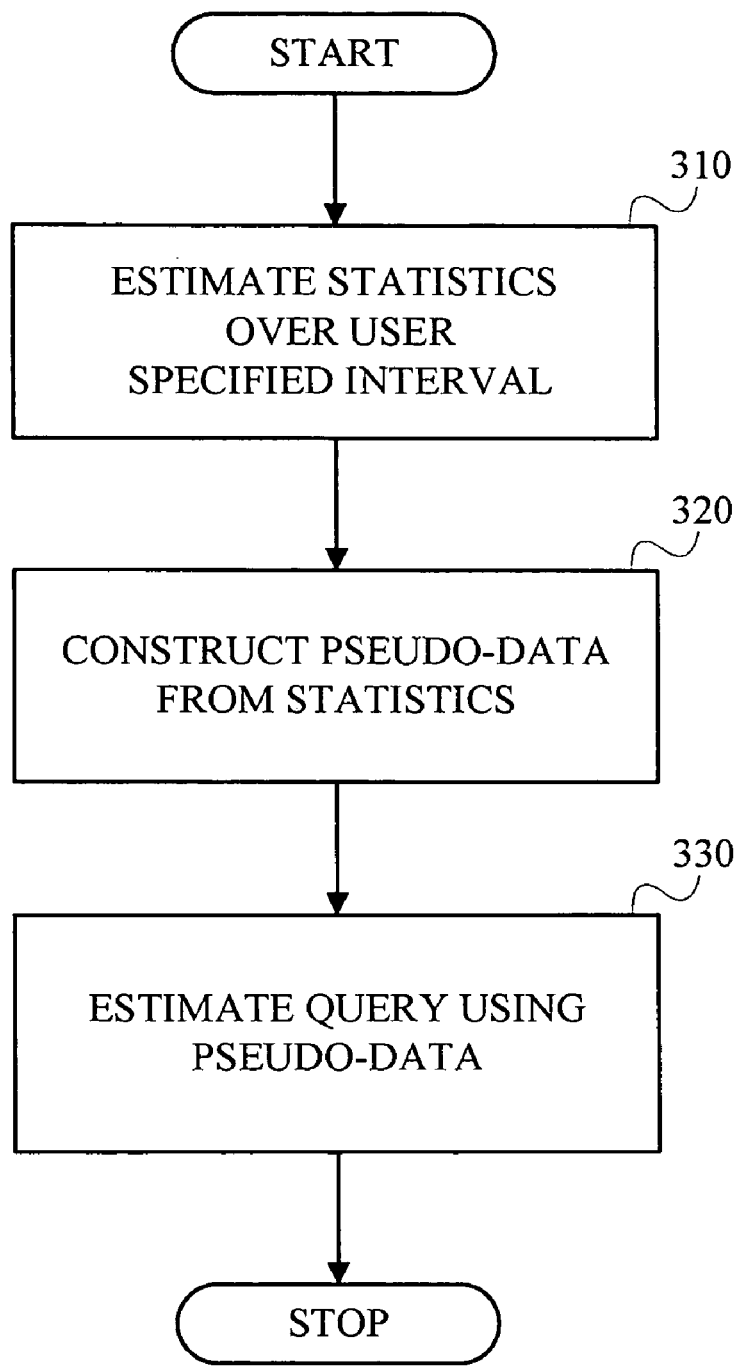
FIG. 3 is a flow chart illustrating a process for resolving individual queries in the data, according to an embodiment of the present invention.

Referring now to FIG. 3, a flow chart illustrates the process of resolving the individual queries in the data. It is assumed here that the query involves a future time interval. As shown, in step 310, the statistics for the future time interval are estimated by using the statistics obtained from the data stream. In step 320, these statistics are then used to generate pseudo-data records. In step 330, the selectivity estimation of the query is then done using the pseudo-data records.

Figure 4:
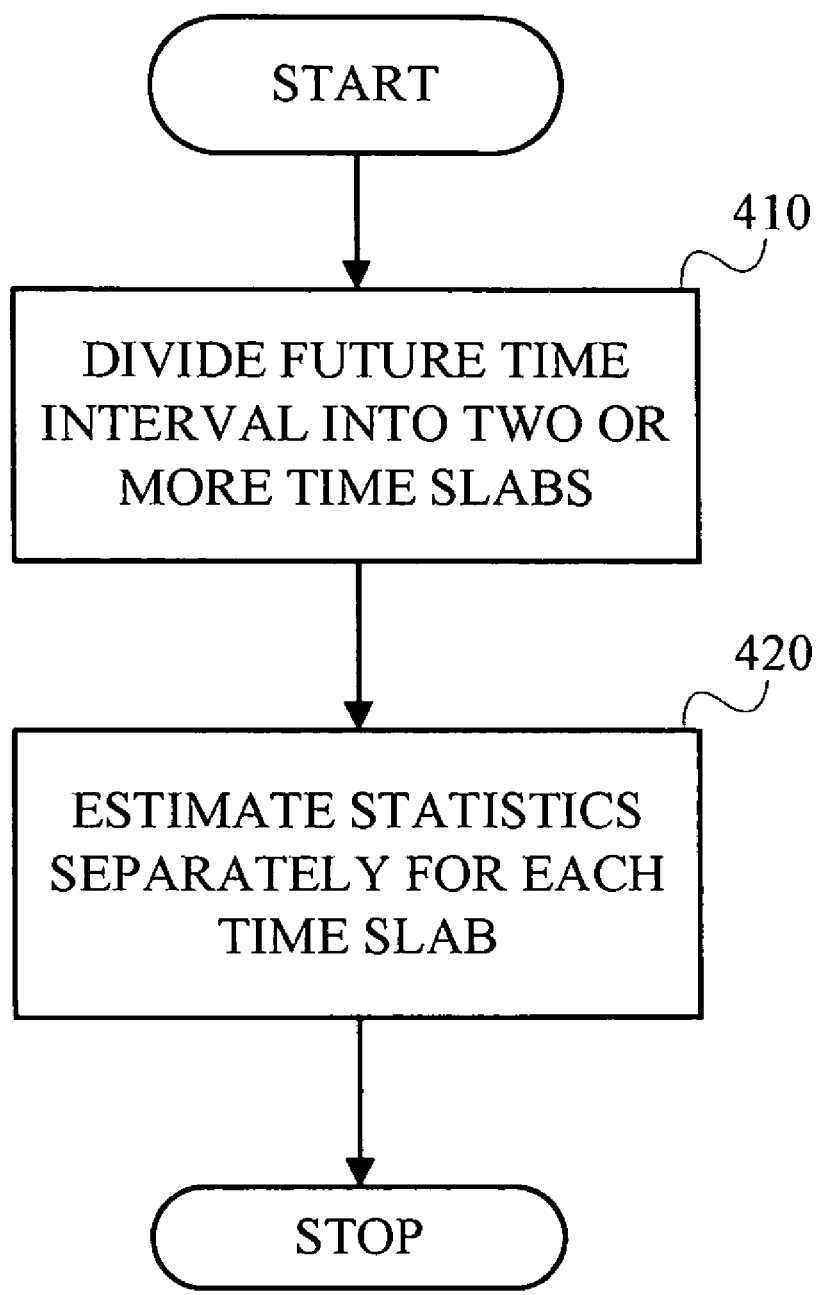
FIG. 4 is a flow chart illustrating a process for using statistics in segmented streams for predictive query estimation, according to an embodiment of the present invention.

Referring now to FIG. 4, a flow chart illustrates the process of estimating statistics for a future time interval. As shown, in step 410, the future time interval is divided into two or more time slabs, with a time slab being a time period of shorter length than the entire future time interval. For each time slab, separately, the first and second order statistics are estimated using polynomial regression. Once these statistics have been estimated, the statistics in the corresponding time interval are computed in step 420.

Figure 5:
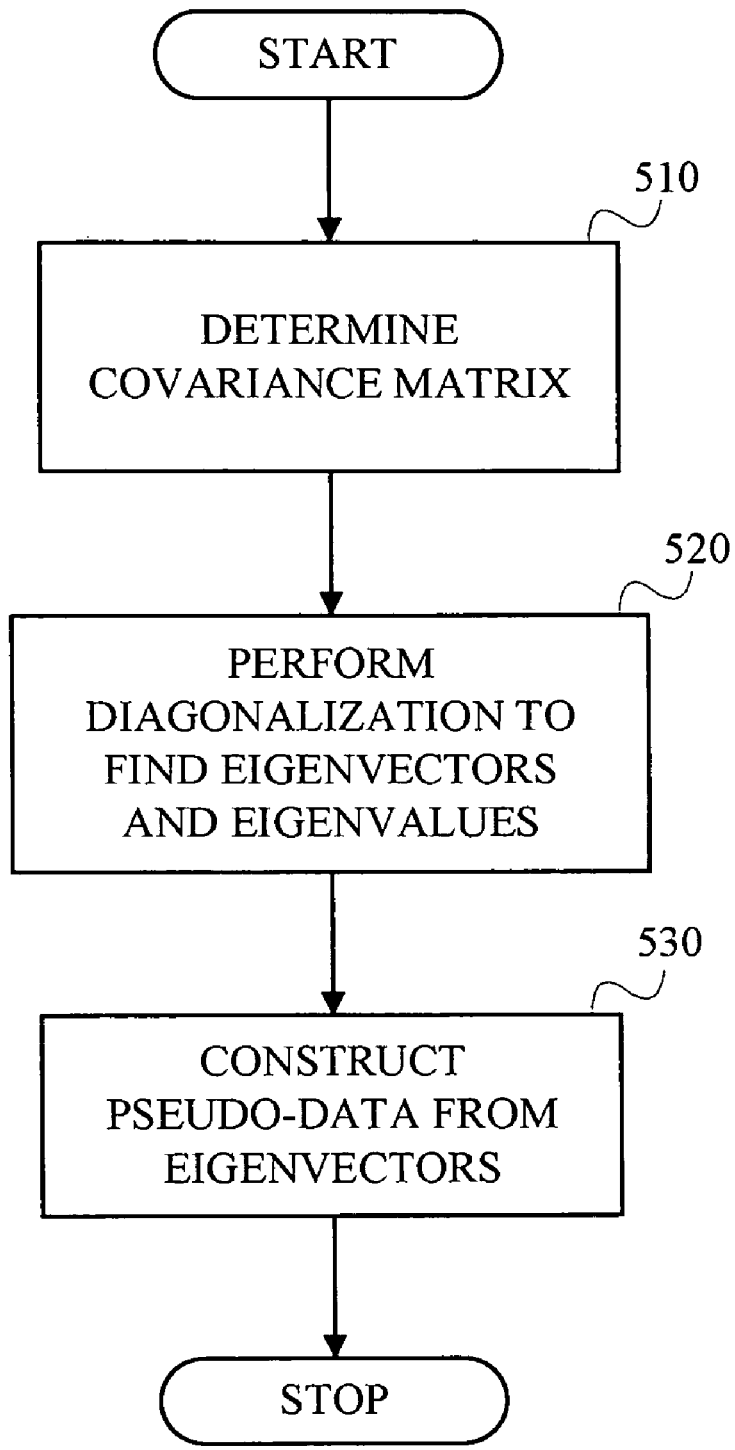
FIG. 5 is a flow chart illustrating a process for using a covariance matrix for predictive data generation, according to an embodiment of the present invention.

Referring now to FIG. 5, a flow chart illustrates a process for using a covariance matrix for predictive data generation, according to an embodiment of the present invention. As shown, in step 510, a covariance matrix of the data is constructed. The covariance matrix Q is denoted by $C(Q)=[C_{\{ij\}}]$. Therefore, $C_{\{ij\}}$ is equal to the covariance between the dimensions i and j. In step 520, diagonalization of the covariance matrix is performed to find eigenvectors and eigenvalues. The covariance matrix is diagonalized by $C(Q)=P(Q)\cdot \Delta Q \cdot P(Q)^T$. The columns of P(Q) represent the orthonormal eigenvectors, and $\Delta Q$ is a diagonal matrix that contains the eigenvalues. The eigenvectors of P(Q) represent an axis system in which the second order correlations of Q are removed. The eigenvalues of $\Delta Q$ equal the variances of the data Q along the corresponding eigenvectors. The orthonormal columns of the matrix P(Q) define a new axis system of transformation on Q, in which $\Delta Q$ is the new covariance matrix. The new axis system of transformation represented by Q has second-order independence between the dimensions of the transformed system, because of this the data values along each of the transformed dimensions can be generated independently of each other. In step 530, the data points along each of the individual axis systems of transformation are generated. The covariance matrix serves the essential purpose of summarizing the hidden structure of the data, this is leveraged in order to generate the most relevant pseudo-data records.

Although the illustrative embodiment of the present invention has been described herein with reference to the accompanying drawings, it is to be understood that the invention is not limited to those precise embodiments, and that various other changes and modfications may be made by one skilled in the art without departing from the scope or spirit of the invention.

What is claimed is:

1. A method of forecasting at least one characteristic of a data stream, comprising a computer performing the steps of:

obtaining statistics from the data stream;

generating estimated statistics for a future time interval based on at least a portion of the obtained statistics;

utilizing at least a portion of the estimated statistics to generate one or more representative pseudo-data records within the future time interval; and utilizing the one or more pseudo-data records for the forecasting of at least one characteristic of a data stream;

wherein the obtained statistics comprise summary statistics and the step of obtaining statistics from the data stream comprises obtaining at least one of zeroith, first and second order statistics, representing each set of statistics as the sum of the corresponding base statistics, and continually receiving data points from the data stream, and continually updating the data points into the statistics using additive operations;

wherein the step of updating the statistics using additive operations comprises computing a distance between each incoming data point to a centroid of the statistics of the closest cluster, adding the data point to the closest centroid, and updating the corresponding statistics;

wherein the step of generating estimated statistics for a future time interval comprises dividing the interval into two or more time intervals, and the step of dividing the future time interval into two or more time intervals comprises estimating first and second order statistics for each of the time intervals;

wherein the step of generating the one or more pseudo-data records comprises determining a covariance matrix, using the covariance matrix to find eigenvectors and eigenvalues, and using the eigenvectors to construct the psuedo-data.

* * * * *